(No Model.)
S. McGARVIN.
RUNNING GEAR.
No. 436,610. Patented Sept. 16, 1890.
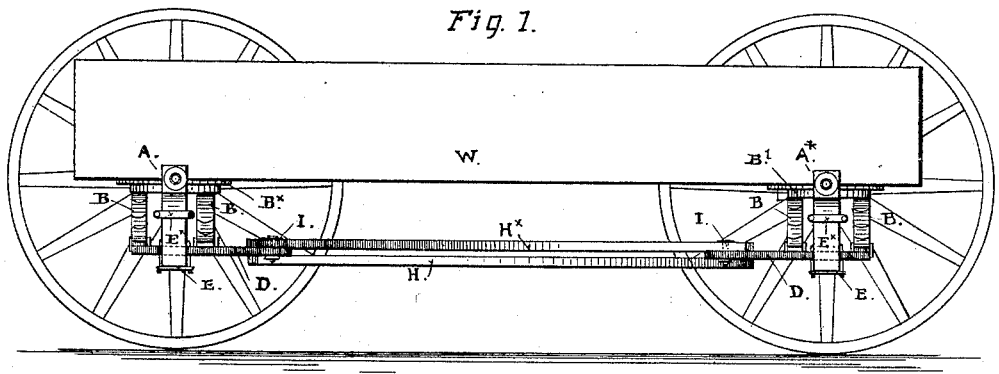
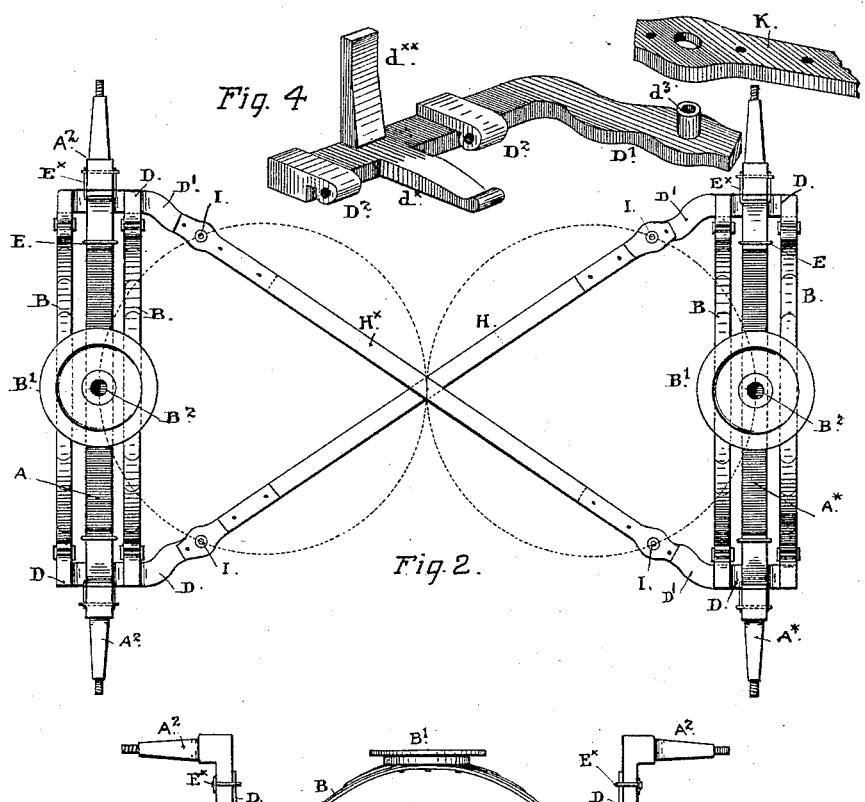
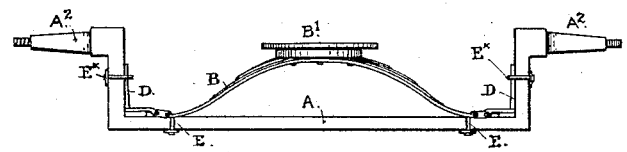
Witnesses: Inventor:

UNITED STATES PATENT OFFICE.

SMITH McGARVIN, OF SAN JOSÉ, CALIFORNIA.

RUNNING-GEAR.

SPECIFICATION forming part of Letters Patent No. 436,610, dated September 16, 1890.

Application filed March 24, 1890. Serial No. 345,135. (No model.)

*To all whom it may concern:*

Be it known that I, SMITH MCGARVIN, a citizen of the United States, residing in the city of San José, county of Santa Clara and State of California, have invented certain new and useful Improvements in Trucks and Wagons, of which the following is a specification.

My invention relates to an improved truck or wagon having both axles swiveled or pivoted on the center and coupled together to cramp or turn in opposite directions on equal arcs; and it has for its object more especially to produce a running-gear of this character for a truck or wagon of considerable degree of simplicity and at low cost of manufacture, at the same time combining the important qualities of lightness with suitable strength and durability.

I secure the desired objects by means of certain construction and combination of parts, as hereinafter described and illustrated, the accompanying drawings, that form a part of this specification, being referred to by letters.

Figure 1 represents in side view a wagon with running-gear constructed according to my improvement. Fig. 2 is a top view of the running-gear with the wagon-body taken off. Fig. 3 is a front view, on a smaller scale, of one of the axles and the connections for the springs. Fig. 4 is a view in perspective of one of the irons that couple the reach to the axle and carry the ends of the body-springs.

The front axle A and the rear axle $A^\times$ are of the kind commonly known as "cranked axles," each one being turned upright at the ends to bring the spindles $A^2$ above the body of the axle. The wagon-body W is set upon semi-elliptical springs B B and on fifth-wheels B' with king-bolts $B^2$. The springs are set in pairs, or two on each axle, and are connected by shackles to the angle-irons D. These irons set in the angles of the axle and are held by axle-clips and ties, the horizontal member $d^\times$ of the iron being secured by the clip E and the upright member $d^{\times\times}$ being held against the upright or crank portion of the axle by the clip $E^\times$. The horizontal part of the iron sets across the axle and has ears or lugs $D^2$ $D^2$ with knuckles to take the shackle-bolts of the body-springs, and this horizontal part of the iron is carried inwardly or toward the center of the gear with a bend or off-set D', as shown in Figs. 2 and 4 of the drawings. To these extensions D' are attached the reaches H $H^\times$ by pivot-joints I I, the end of the part having an upright tubular pin or hollow post $d^3$, that takes through an eye in the reach near the end; or, as I prefer to construct the joint, the eye is formed in a plate K, which is bolted on the end of the reach. A wagon-bolt passing through the hollow post $d^3$ serves to unite these parts. All the joints connecting the reaches to the axles are of the same construction, and in producing these irons the length of the extensions D' and the position of the pivotal points I are determined by the distance between the axles and also the distance apart of the irons on the same axle, because it is a necessary feature in this construction to have the pivotal points I of both front and rear axles located on two great circles which are tangent to each other at the center of the gear where the cross-reaches pass each other, and which pass, also, through the centers $B^2$ on which the angles turn. The arms or extensions D' are bent, therefore, to such shape that the pivots I are located on these two circles when the two axles stand parallel and directly across the body.

By reference to the drawings, Fig. 2, it will be seen that the radius of each circle is equal to one-half the distance between the king-bolts and the center where the cross-reaches intersect the other. By this construction I secure smooth and equal movement of the two axles in turning a circle. The knuckles on the angle-iron set on opposite sides of the axle, and at suitable distance from it to let the springs clear of the axle. The fifth-wheels are bolted directly to the spring, and the body is of less width than the space between the uprights of the cranked axle. Being arranged in this manner, it will be seen that the rear axle follows the angular movements of the front axle and is cramped or turned in an equal arc with it by virtue of the cross-reaches. The body can therefore be set quite low and the wheels can be brought well up to the body.

This improvement also combines the qualities of strength and simplicity, and cheapness of construction and repairs.

The running-gear is particularly adapted for farm-wagons and similar wheeled vehicles that are required to work in confined or narrow situations, as between rows of plants and trees in orchards or vineyards, and to make sharp turns in small room.

Having thus fully described my invention, what I claim, and desire to secure by Letters Patent, is—

1. The combination of cranked axles, angle-irons secured in the cranks of the axles, springs coupled thereto at the ends, having fifth-wheels for the wagon-body, the cross-reaches, and the couplings having knuckles for the spring-shackles, and having extensions to which the cross-reaches are pivoted, substantially as described.

2. In a running-gear for vehicles having a cranked axle, the angle-iron D, having knuckles for the body, spring-shackles, the horizontal and upright members, and the extension D'.

In testimony that I claim the foregoing I have hereunto set my hand and seal.

SMITH McGARVIN. [L. S.]

Witnesses:
EDWARD E. OSBORN,
B. L. RYDER.